(12) United States Patent
Yagi et al.

(10) Patent No.: US 6,583,605 B2
(45) Date of Patent: Jun. 24, 2003

(54) CHARGING METHOD AND CHARGER

(75) Inventors: Tatehito Yagi, Hyogo (JP); Takahiro Yamashita, Hyogo (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 10/062,534

(22) Filed: Feb. 5, 2002

(65) Prior Publication Data

US 2002/0105305 A1 Aug. 8, 2002

(51) Int. Cl.[7] .................................................. H01J 7/11
(52) U.S. Cl. ....................................................... 320/148
(58) Field of Search ......................................... 320/148

(56) References Cited

U.S. PATENT DOCUMENTS 5,808,442 A * 9/1998 Kaite et al. ................. 320/125
5,939,865 A * 8/1999 McGrath et al. ............ 320/156

* cited by examiner

Primary Examiner—Gregory J. Toatley, Jr.
(74) Attorney, Agent, or Firm—Wenderoth, Lind & Ponack, L.L.P.

(57) ABSTRACT

In the invention, a plurality of batteries are connected in parallel with each other and are charged, and $-\Delta V$ of a drop of a battery voltage from a peak voltage is detected to judge full charge, and currents flowing to the batteries connected in parallel are detected in the state where charging is stopped by the drop of $-\Delta V$. When the currents flowing to all the batteries are larger than a set current in the state where charging is stopped, it is judged that full charge is not attained and charging is resumed, and when the currents are smaller than the set current, it is judged that all the batteries are fully charged.

13 Claims, 3 Drawing Sheets

CHARGING METHOD AND CHARGER

This application is based on Application No. 029787 filed in Japan on Feb. 6, 2001, the content of which is incorporated hereunto by reference.

BACKGROUND OF THE INVENTION

The present invention relates to a charger in which a plurality of batteries are connected in parallel with each other and are charged together.

A charger in which a plurality of batteries are connected in parallel with each other and are charged, can charge the plurality of batteries through a simple circuit. Besides, since voltages of the plurality of batteries connected in parallel with each other become equal to each other, this charger has also a feature that while overcharging of all the batteries is prevented, they can be fully charged. However, when the plurality of batteries having a difference in residual capacity are connected in parallel with each other and are charged together, there is a case where full charge is erroneously detected. For example, when a battery having a residual capacity close to 100% and a battery having a residual capacity close to 0% are charged together, although only the battery having the residual capacity of 0% is charged, at this time, there is a case where a characteristic is shown in which an ascent curve of battery voltage is lowered from the peak voltage by $-\Delta V$. In the method of judging the full charge by detecting that the voltage is lowered from the peak voltage by $-\Delta V$, when this voltage characteristic occurs, it is erroneously judged that the full charge has been attained, and charging is ended. Thus, it becomes impossible to fully charge all the batteries.

This defect can be resolved by a method in which when $-\Delta V$ is detected, charging is stopped, and then, after charging is suspended for a specified time, charging is resumed, and $-\Delta V$ is again detected to judge the full charge. That is, the defect can be resolved by the method in which $-\Delta V$ is detected plural times and the full charge is judged. However, in the method in which the full charge is judged by detecting $-\Delta V$ plural times, since charging is further performed after all the batteries are fully charged, there is a case where the battery is overcharged. Besides, there occurs a defect that the overcharge of the battery often occurs and the battery is deteriorated. This is because the erroneous detection of the full charge through $-\Delta V$ occurs only when the plurality of batteries in a specific state are charged, and it does not occur when the plurality of batteries not having a large difference in residual capacity are charged in parallel.

The present invention has been developed in order to solve the defects. A primary object of the invention is to provide a charging method and a charger in which batteries having a difference in residual capacity can be normally fully charged without overcharging a fully charged battery.

SUMMARY OF THE INVENTION

In a charging method of the invention, a plurality of batteries are connected in parallel with each other and are charged, a battery voltage under charging is detected, $-\Delta V$ by which the battery voltage is lowered from a peak voltage is detected, and full charge is judged. Further, in the charging method of the invention, after the full charge is detected from detection that the battery voltage is lowered from the peak voltage by $-\Delta V$, charging is stopped, and currents flowing to the batteries connected in parallel are detected in a state where charging is stopped. When all the batteries are in a full charge state, since voltages of all the batteries are equal to each other, the currents do not flow. However, when all the batteries are not fully charged and there is a difference in residual capacity, a voltage difference is generated and the currents flow to the batteries connected in parallel. Accordingly, when the currents flow to the batteries, it is judged that the full charge has not been attained, and charging is resumed. The battery to be charged by the method of the invention is a battery in which the full charge can be detected by $-\Delta V$, for example, a nickel-hydrogen battery or a nickel-cadmium battery. The number of times recharging is performed is preferably made one.

A charger of the invention comprises a charging power source portion for charging a plurality of batteries connected in parallel with each other, a charging switch for connecting the charging power source portion to the batteries connected in parallel, current detection portions for detecting currents of the batteries connected in parallel, and a charging control portion for controlling the charging switch so as to turn it on or off by detecting battery voltages. The charging control portion detects $-\Delta V$ as a drop of the battery voltage from the peak voltage and detects the full charge, and further, in the state where the charging switch is turned off, the charging control portion again detects the full charge state of the batteries through the current values of the current detection portions.

The foregoing charging method and device have a feature that batteries having a difference in residual capacity can be normally fully charged without overcharging a fully charged battery. This is because after the full charge is detected through $-\Delta V$ by which the battery voltage is lowered from the peak voltage, charging is stopped, and currents flowing to the batteries connected in parallel are detected in the state where charging is stopped, and the full charge of the batteries is again detected. In the above charging method and charger, the full charge is not judged in such a manner that after $-\Delta V$ is detected and a judgment of full charge is made, charging is further performed to detect $-\Delta V$ plural times, but it is possible to accurately judge whether all the batteries are fully charged in the state where charging is stopped. Accordingly, a fully charged battery is not overcharged or when there is a battery which is not fully charged, charging is resumed and the batteries can be normally fully charged.

The above and further objects and features of the invention will more fully be apparent from the following detailed description with accompanying drawings.

DETAILED DESCRIPTION OF PREFERED EMBODIMENTS

Figure 1:
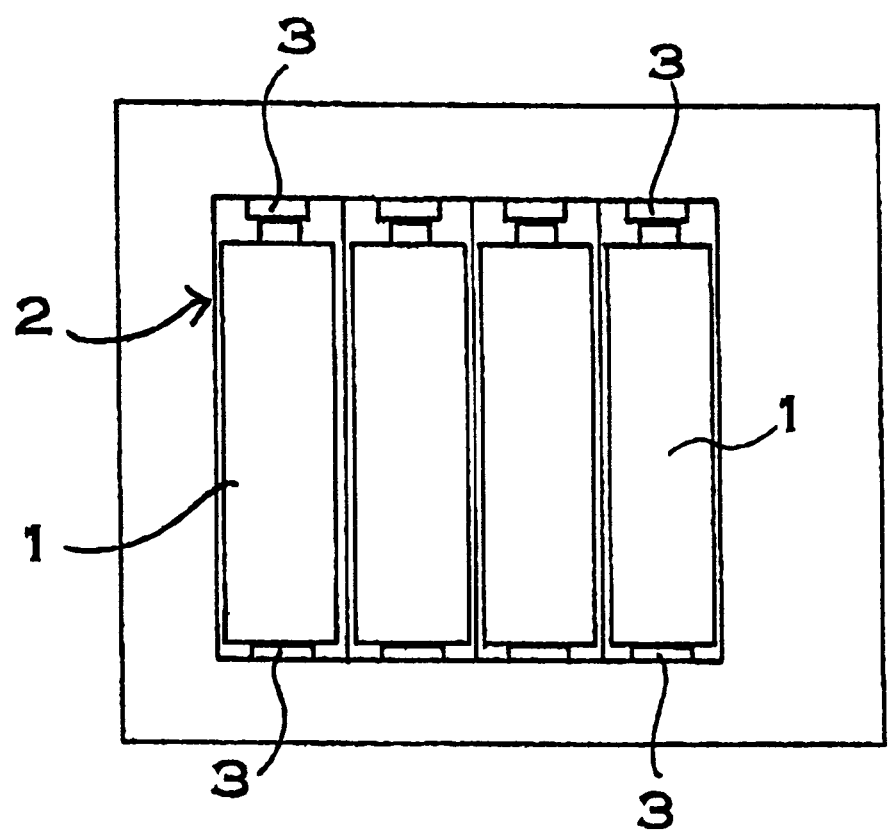
FIG. 1 is a plan view of a charger of the invention.

In a charger shown in a plan view of FIG. 1, a mount portion 2 on which a plurality of batteries 1 are detachably mounted is provided in a case. The mount portion 2 has such a shape that dry battery type batteries 1, that is, size AA, size AAA, size C, or size D type batteries 1 can be mounted, and charging terminals 3 in contact with plus and minus electrodes of each of the batteries 1 mounted on this are provided. The batteries 1 mounted on the mount portion 2 are connected in parallel with each other and are charged, in the charger shown in the drawing, the shape of the mount portion 2 is made such that a cylindrical battery can be mounted. However, the mount portion can also be made to have such a shape that a rectangular battery or a slim battery can be mounted. The batteries 1 mounted on the mount portion 2 are connected to a charging circuit through the charging terminals 3.

Figure 2:
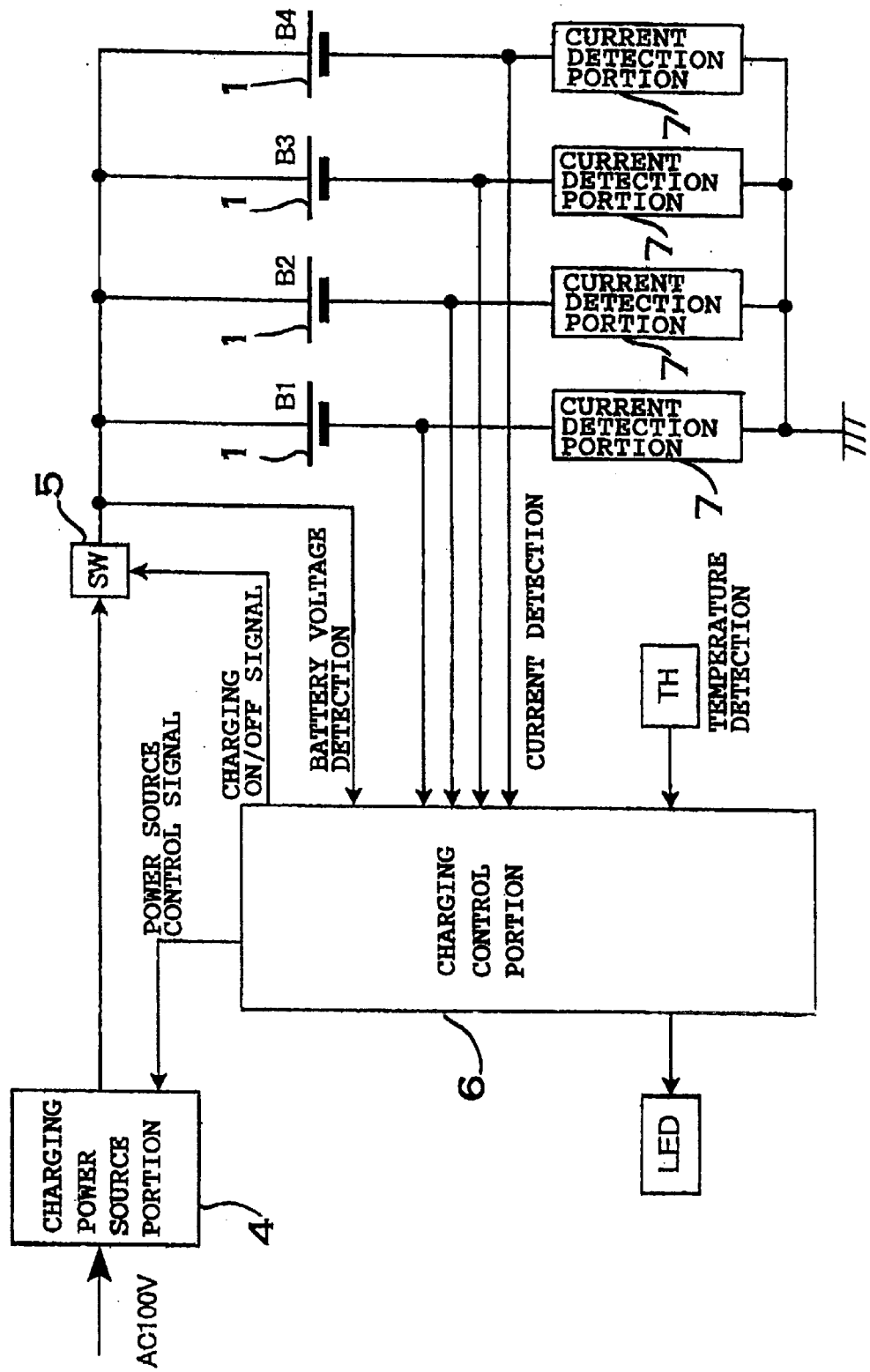
FIG. 2 is a circuit diagram of a charger of an embodiment of the invention.

FIG. 2 is a circuit diagram of the charger. The charger of this drawing includes a charging power source portion 4 for charging the plurality of batteries 1 connected in parallel with each other, a charging switch 5 for connecting the charging power source portion 4 to the batteries 1 connected in parallel, current detection portions 7 for detecting currents of the respective batteries 1 connected in parallel, and a charging control portion 6 for controlling the charging switch 5 so as to turn it on or off by detecting a battery voltage.

The plus side charging terminals 3 are connected together and are connected to the charging power source portion 4 through the charging switch 5. The minus side charging terminals 3 are connected to the earth through the current detection portions 7. The current detection portions 7 connected in series with the batteries 1 are low resistance resistors. The low resistance resistor generates a voltage in proportion to a current flowing to the battery 1. The charging control portion 6 amplifies voltages outputted from the current detection portions 7 and detects the currents flowing to the respective batteries 1.

The charging power source portion 4 converts an inputted alternating current into a direct current output voltage and output current by which the plurality of batteries 1 connected in parallel with each other can be charged. If the charging power source portion 4 has a built-in constant-current circuit, the charging current of the battery 1 can be controlled.

The charging switch 5 is a semiconductor switching element such as a transistor or an FET. The charging switch 5 charges the battery 1 when it is in an on state, and stops charging when it is in an off state. The charging switch 5 is controlled to be turned on or off by the charging control portion 6. The charging control portion 6 detects that the voltage of the battery 1 under charging is lowered from the peak voltage by $-\Delta V$, and detects the full charge, and when the battery 1 is fully charged, the charging switch 5 is turned off and charging is ended.

The charging control portion 6 detects the currents flowing to the respective batteries 1 through signals inputted from the current detection portions 7, and confirms whether the batteries 1 are fully charged. The charging control portion 6 detects that the battery voltage is lowered from the peak voltage by $-\Delta V$ and Judges the battery to be fully charged. After judging it to be fully charged, the charging control portion 6 turns off the charging switch 5 to stop charging. In this state, the currents flowing to the respective batteries 1 are detected, and it is confirmed whether or not the batteries 1 are correctly fully charged. If all the batteries 1 connected in parallel are fully charged, the currents flowing to the batteries 1 become approximately zero in the state where the charging switch 5 is turned off. This is because the voltages of the fully charged batteries 1 become almost equal to each other. Accordingly, the full charge is detected through $-\Delta V$, and thereafter, the charging switch 5 is turned off, and when the currents flowing to the batteries 1 are approximately zero, it is judged that all the batteries 1 are correctly fully charged.

However, if the currents flow to the batteries 1 in the state where the full charge is detected through $-\Delta V$ and the charging switch 5 is turned off, the charging control portion 6 does not judge that all the batteries 1 are fully charged, but again turns on the charging switch 5 to resume charging. At this time, even if a battery which is fully charged and a battery which is not fully charged are simultaneously charged, most of the current flows to the battery which is not fully charged, and only a minute current flows to the battery which is fully charged. Thus, even if charging is resumed, there is no possibility that the battery which is fully charged is overcharged. When the charging switch 5 is turned on and charging of the batteries 1 progresses, the battery voltage is again raised, and when all the batteries 1 are fully charged, the battery voltage shows the characteristic in which it is lowered from the peak voltage by $-\Delta V$. Accordingly, the charging control portion 6 detects that the battery voltage is lowered from the peak voltage by $-\Delta V$, and judges that the batteries 1 are fully charged.

When the second $-\Delta V$ is detected, all the batteries 1 are fully charged almost certainly. Accordingly, after the charging control portion 6 detects the full charge through $-\Delta V$ and turns off the charging switch 5, it is possible to judge that all the batteries 1 are fully charged without detecting the battery current again. Accordingly, the number of times recharging is performed after $-\Delta V$ is detected is preferably made one. However, after $-\Delta V$ is detected and the charging switch 5 is turned off, it is also possible to adopt such a way that a current of each of the batteries 1 is always detected, and only when the battery current is approximately zero, the battery is judged to be fully charged, and charging is ended.

In the present invention, in the state where $-\Delta V$ is detected and the charging switch 5 is turned off, the current flowing to the battery 1 is detected, the detected current is compared with a set current, and it is judged whether or not charging is to be resumed. If the detected current is smaller than the set current, it is judged that all the batteries 1 are fully charged and charging is not resumed. If the detected current is larger than the set current, it is judged that all the batteries 1 are not fully charged, and the charging switch 5 is turned on to resume charging. The set current for judgment whether charging is to be resumed is set to, for example, $\frac{1}{100} \times C$. Further, in the case where the charging control portion 6 converts a voltage value inputted from the current detection portion 7 Into a digital value by an AND converter, when the value is smaller than a minimum unit, it is judged that all the batteries 1 are fully charged, and when the value is larger than the minimum unit, it is judged that the full charge is not attained.

Figure 3:
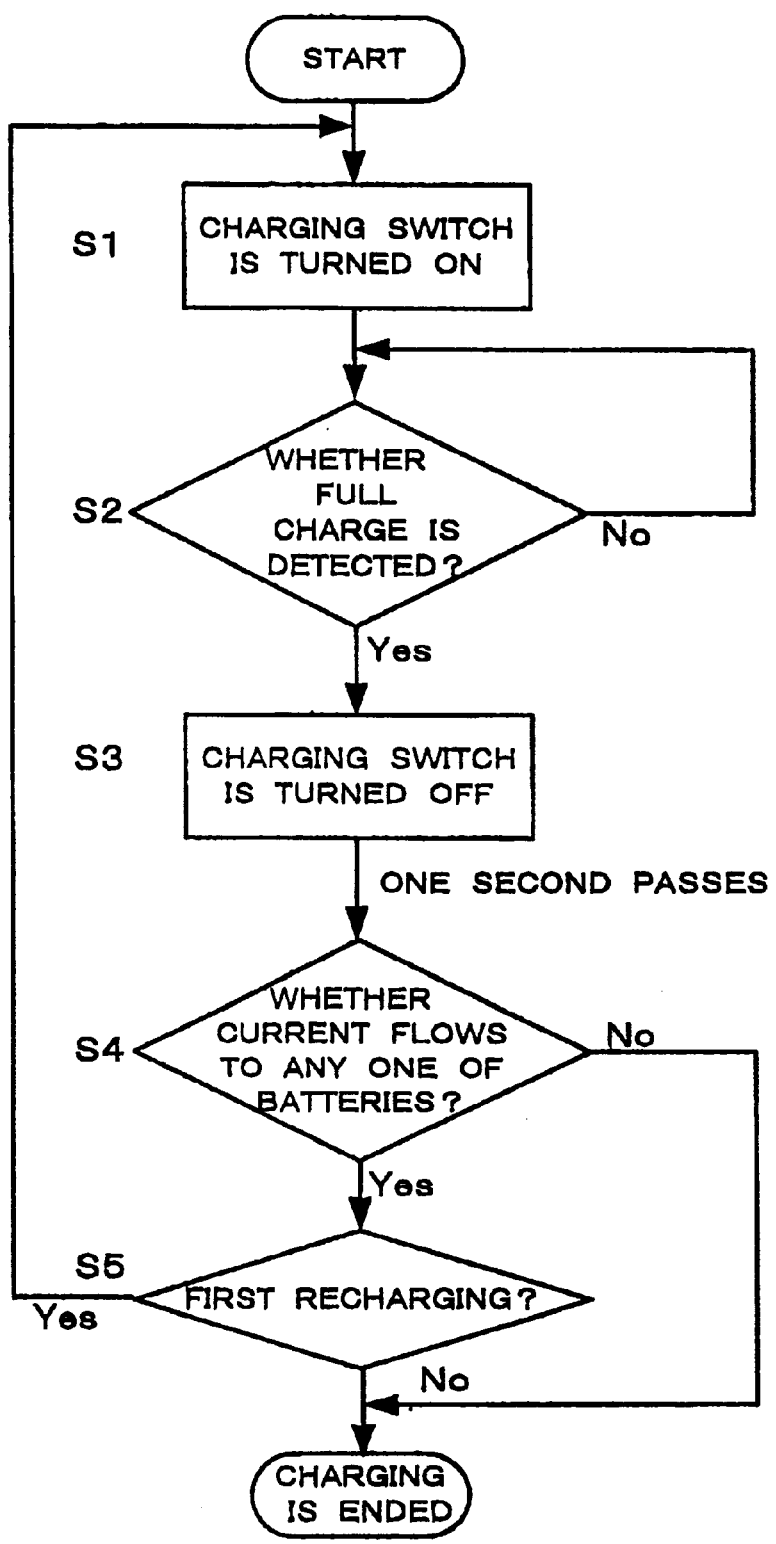
FIG. 3 is a flowchart showing a process in which the charger of FIG. 2 charges a plurality of batteries.

The process in which the charger of FIG. 2 charges the plurality of batteries is shown in a flowchart of FIG. 3. In this flowchart, the batteries 1 are fully charged through following steps.

[Step of S1]

The charging control portion 6 turns on the charging switch 5, and starts to charge the plurality of batteries 1 set on the mount portion 2. The batteries 1 are charged in the state where they are connected in parallel with each other. At this time, even if a fully charged battery and an empty battery are simultaneously charged in the state where they are mixed, most of the current flows to the empty battery, and only a minute current flows to the fully charged battery. Accordingly, there is no possibility that the fully charged battery is overcharged.

[Step of S2]

The charging control portion 6 detects the voltages of the batteries 1, and detects the full charge through the state where the battery voltage is lowered from the peak voltage by $-\Delta V$. Until the voltage of the battery 1 is lowered by $-\Delta V$, this step is looped.

[Step of S3]

When the state where the battery voltage is lowered from the peak voltage by $-\Delta V$ is detected and the full charge is detected, at this step, the charging control portion 6 turns off the charging switch 5 to stop charging of the batteries 1.

[Step of S4]

The currents flowing to the respective batteries 1 are detected, and it is detected whether or not the current flows to any one of the batteries 1. If the current does not flow to the battery 1, or if the current of the battery 1 is smaller than the set current, it is judged that all the batteries 1 are fully charged, and the procedure jumps to a step of S6 and ends charging.

[Step of S5]

If the current flows to the battery 1, it is judged whether or not first recharging is started, and if the recharging is the first, the procedure jumps to the step of S1, and charging is resumed. If the recharging is not the first, that is, the second, even if the current flows to the battery 1 in the state where the charging switch 5 is turned off, recharging is not resumed but charging is ended.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A charging method comprising the steps of:
   connecting a plurality of batteries in parallel with each other and charging them;
   detecting a battery voltage under charging;
   detecting $-\Delta V$ by which the battery voltage is lowered from a peak voltage and judging full charge; and
   stopping charging after the full charge is detected through $-\Delta V$, detecting currents flowing to the batteries connected in parallel in a state where charging is stopped, judging that the batteries are not fully charged when the battery current is larger than a set current, and resuming recharging.

2. A charging method according to claim 1, wherein the battery is one of a nickel-hydrogen battery and a nickel-cadmium battery.

3. A charging method according to claim 1, wherein the number of times recharging is performed is one.

4. A charging method according to claim 1, wherein the set current for a judgment whether charging is to be resumed is $\frac{1}{100} \times C$.

5. A charging method according to claim 1, wherein after $-\Delta V$ is detected and a charging switch is turned off, the currents of the respective batteries are detected, and only when the battery currents are approximately zero, a judgment of the full charge is made and charging is ended.

6. A charging method according to claim 1, wherein the plurality of batteries are constant-current charged.

7. A charger comprising:
   a charging power source portion for charging a plurality of batteries connected in parallel with each;
   a charging switch for connecting the charging power source portion to the batteries connected in parallel;
   current detection portions for detecting currents of the batteries connected in parallel; and
   a charging control portion for controlling the charging switch so as to turn it on or off by detecting battery voltages,
   wherein the charging control portion detects $-\Delta V$ of a drop of the battery voltage from a peak voltage and detects full charge, and in a state where the charging switch is turned off, a full charge state of the batteries is again detected through a current value of the current detection portions.

8. A charger according to claim 7, wherein the charging power source portion is a power source having a constant-voltage characteristic.

9. A charger according to claim 7, wherein in the state where the charging control portion detects $-\Delta V$ of the drop of the battery voltage from the peak voltage and turns off the charging switch, when the current value of the current detection portions is smaller than a set current, it is judged that all the batteries are fully charged and the charging switch is turned off, and when the current value of the current detection portions is larger than the set current, the charging switch is turned on and charging is resumed.

10. A charger according to claim 9, wherein the set current for resumption of charging is made $\frac{1}{100} \times C$.

11. A charger according to claim 7, wherein the charging control portion judges all the batteries to be fully charged at second detection of $-\Delta V$.

12. A charger according to claim 9, wherein in the state where the charging control portion detects $-\Delta V$ and turns off the charging switch, only when the battery current is approximately zero, the batteries are judged to be fully charged and charging is ended.

13. A charger according to claim 7, wherein the charger is a charger for one of a nickel-hydrogen battery and a nickel-cadmium battery.

* * * * *